(No Model.)
M. CHASE.
TIRE FOR VEHICLE WHEELS.
No. 271,194. Patented Jan. 23, 1883.
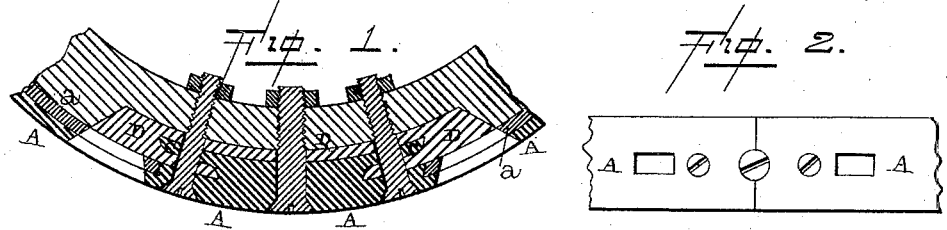
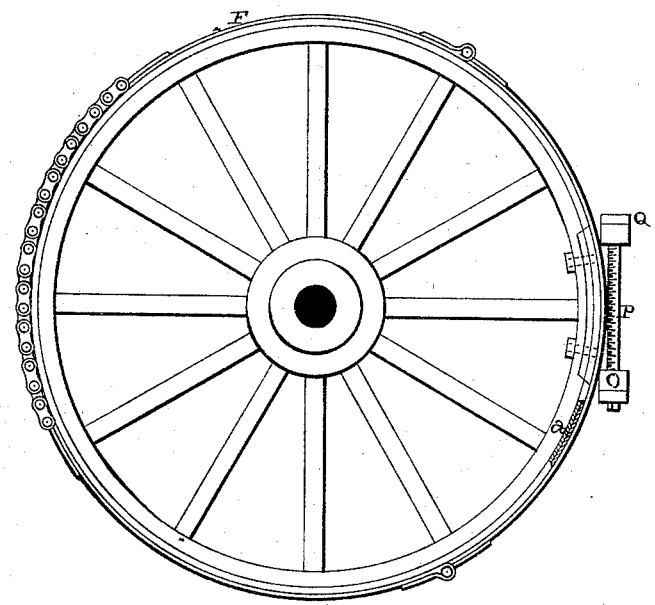
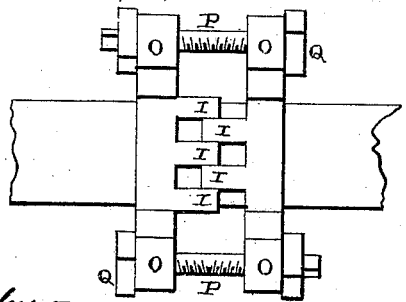
Witnesses.
Louis F. Gardner
E. D. York
Inventor
Milton Chase,
per
F. A. Lehmann,
Att'y

UNITED STATES PATENT OFFICE.

MILTON CHASE, OF HAVERHILL, ASSIGNOR OF TWO-THIRDS TO E. DE LA GRANJA AND HORACE CHASE, OF BOSTON, MASSACHUSETTS.

TIRE FOR VEHICLE-WHEELS.

SPECIFICATION forming part of Letters Patent No. 271,194, dated January 23, 1883.

Application filed November 15, 1882. (No model.)

*To all whom it may concern:*

Be it known that I, MILTON CHASE, of Haverhill, in the county of Essex and State of Massachusetts, have invented certain new and useful Improvements in Tire-Tighteners; and I do hereby declare the following to be a full, clear, and exact description of the invention, such as will enable others skilled in the art to which it pertains to make and use it, reference being had to the accompanying drawings, which form part of this specification.

My invention relates to an improvement in tire-tighteners; and it consists in the combination of the tire, having a suitable lip or projection formed upon each end, with the tire-plate, which has corresponding recesses formed upon its top to receive the lips.

Figure 1 is a vertical longitudinal section of the ends of the tire and the tire-plate. Fig. 2 is a plan view of the same. Fig. 3 is a separate view of the devices for tightening the tire upon the wheel. Fig. 4 is a plan view of the ends of the tightener.

A represents a tire which has suitable flanges or lips formed around its edges to catch over the edges of the fellies of the wheel. In between this tire and the fellies of the wheel will be placed any suitable water-proof elastic substance, a, which will allow the wooden part of the wheel to expand and contract without injury. This elastic substance may be composed of rubber, rubber cement, felt, woven fabric, or any other material which will answer for the purpose. This elastic material will be held in place, as is the tire itself, upon the fellies by means of the flanges or lips upon the tire. Upon the inner side of each end of the tire will be formed a suitable lip or projection, C, which extends in opposite directions, and which lips or projections catch in corresponding recesses made in the tire-plate D. These lips or projections on the ends of the tire may be made tapering and the recesses in the tire-plate correspondingly shaped, so that in forcing the tire-plate into position under the ends of the tire the two ends of the tire will be drawn tightly together. After the tire-plate and the ends of the tire have been adjusted into position, two or three bolts will then be passed through the tire, the lips or projections formed thereon, the tire-plate, and the fellies of the wheel. These bolts alone are all that are required to hold the tire in place upon the wheel.

When it becomes necessary to tighten the tire, a band, F, composed of a number of jointed pieces, either in the form of a chain or any other that may be preferred, is passed around the tire, as shown in Fig. 3. Each end of this band is provided with fingers I, which overlap each other and serve to prevent the ends from becoming displaced. Projecting out beyond the sides of each end is a guide, O, through which the right-and-left-handed screws P are placed. Upon each end of each screw is placed a nut, Q, which nut assists in drawing the parts together when the screws are turned by any suitable device applied to their ends. By turning these screws alternately, or at the same time, any desired amount of pressure can be brought to bear upon the tire, so as to force its ends together, or for the purpose of forming a bulge at any part where it is desired to cut the tire, to hammer the part down, or to adjust it by means of a tightening device, as already described. The chain is used as a part of the tightening-band for the purpose of making the band conform more readily to any desired shape.

Having thus described my invention, I claim—

1. A tire having each of its ends provided with a lip or projection, in combination with a tire-plate having suitable recesses to receive the lips or projections, substantially as shown.

2. The combination of a tire having suitable lips or projections formed on the inner side of each of its ends, a tire-plate having recesses to receive the lips or projections, and suitable holding-bolts which are passed through the different parts, substantially as described.

In testimony whereof I affix my signature in presence of two witnesses.

MILTON CHASE.

Witnesses:
EDMUND B. FULLER,
DAVID B. TENNEY.